United States Patent
Khawand et al.

(10) Patent No.: US 7,239,884 B2
(45) Date of Patent: Jul. 3, 2007

(54) METHOD FOR PROVIDING IMPROVED ACCESS TIMES FOR A COMMUNICATION DEVICE

(75) Inventors: Charbel Khawand, Maimi, FL (US); Alfred B. Wieczorek, Plantation, FL (US); Chin P. Wong, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 301 days.

(21) Appl. No.: 10/350,173

(22) Filed: Jan. 23, 2003

(65) Prior Publication Data

US 2004/0147274 A1    Jul. 29, 2004

(51) Int. Cl.
*H04Q 7/20* (2006.01)
*H04B 7/00* (2006.01)
*H04B 1/04* (2006.01)

(52) U.S. Cl. ............... 455/522; 455/69; 455/127.1
(58) Field of Classification Search ........... 455/522, 455/69, 127.1, 434, 343.1
See application file for complete search history.

(56) References Cited

U.S. PATENT DOCUMENTS

| | | | |
|---|---|---|---|
| 5,778,322 A | * | 7/1998 | Rydbeck ............... 455/558 |
| 5,893,036 A | * | 4/1999 | Trandai et al. ........ 455/522 |
| 6,031,832 A | * | 2/2000 | Turina ................. 370/348 |
| 6,615,051 B2 | * | 9/2003 | Saarela ................ 455/522 |
| 6,628,956 B2 | * | 9/2003 | Bark et al. ............ 455/522 |
| 2002/0068596 A1 | * | 6/2002 | Saarela ................ 455/522 |
| 2002/0183086 A1 | * | 12/2002 | Hellmark et al. ..... 455/522 |
| 2004/0029604 A1 | * | 2/2004 | Raaf .................... 455/522 |

OTHER PUBLICATIONS

Nortel Networks "Always On Mode in UMTS." 2001.
Siala, M. et al. "Optimisation of the Interference Cost Generated by the Random Access Channel of the UMTS FDD System." *IEEE*, 2001, pp. 2677-2680.

* cited by examiner

*Primary Examiner*—Tilahun Gesesse

(57) ABSTRACT

A high priority system access technique is provided in which an MS (310) instead of relying on its open loop power level routine to determine its power level for transmission of a system access request uses a higher power level to transmit its access request, such as its RACH preamble. The power level used for transmission of the RACH preamble can be dependent on the particular user and/or in the application (e.g., dispatch, streaming video, etc.). By using a higher power level than the other MSs (520) operating in the system (500), MS (310) has a higher probability of gaining system access and a channel grant in an expeditious fashion. This priority access technique is very helpful for applications that require quick channel grants.

16 Claims, 4 Drawing Sheets

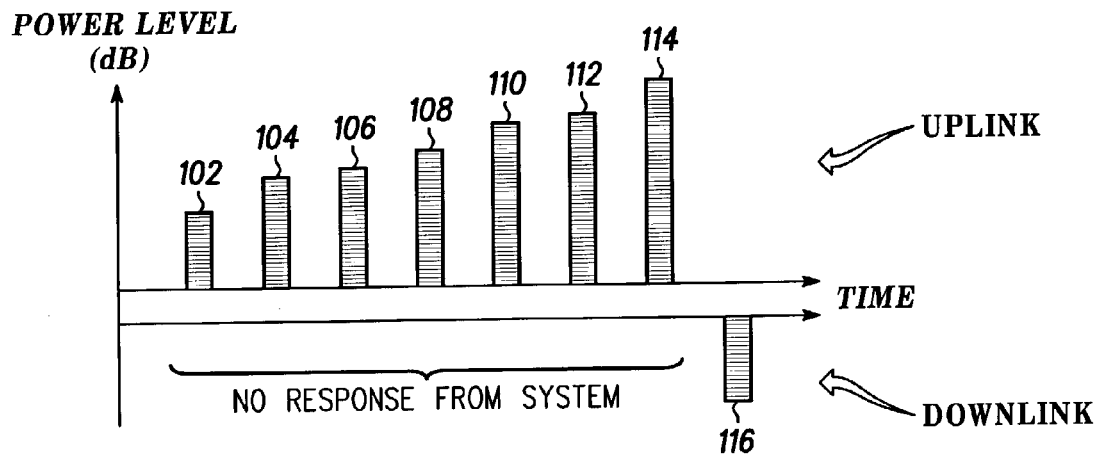
FIG. 1 — PRIOR ART —
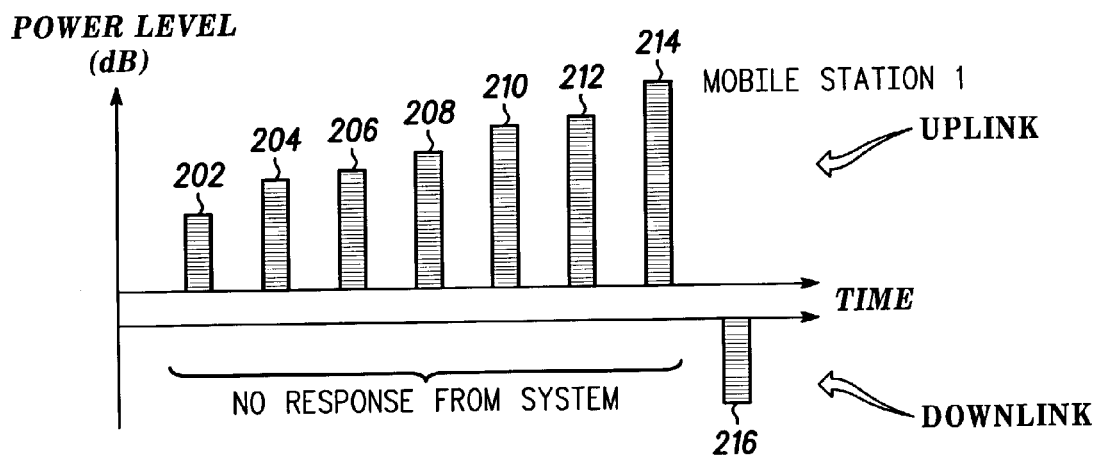
FIG. 2 — PRIOR ART —
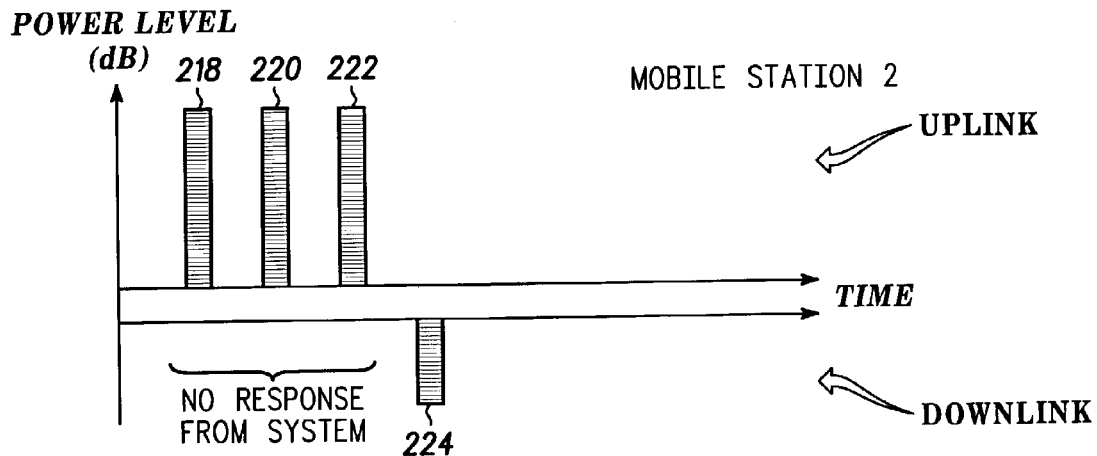
FIG. 3

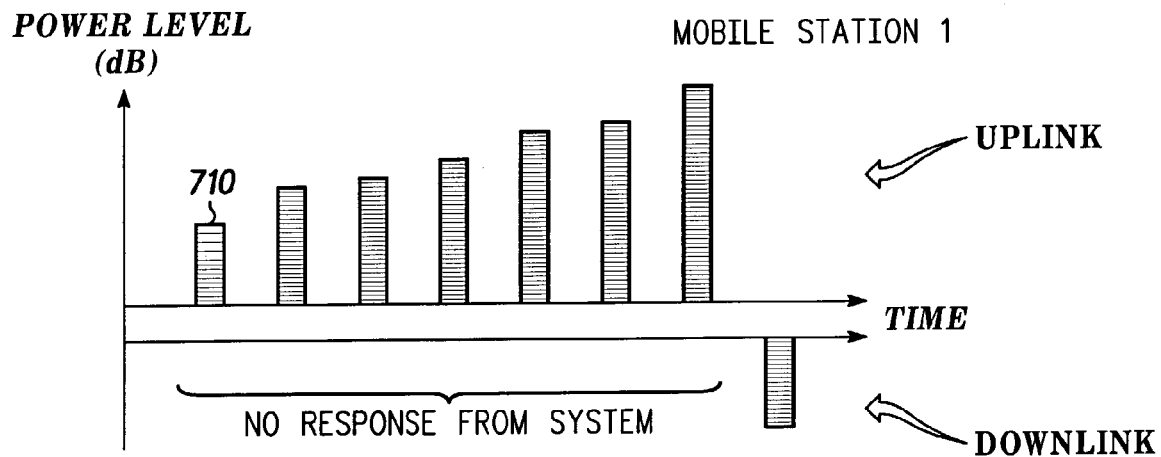
FIG. 8 - PRIOR ART -
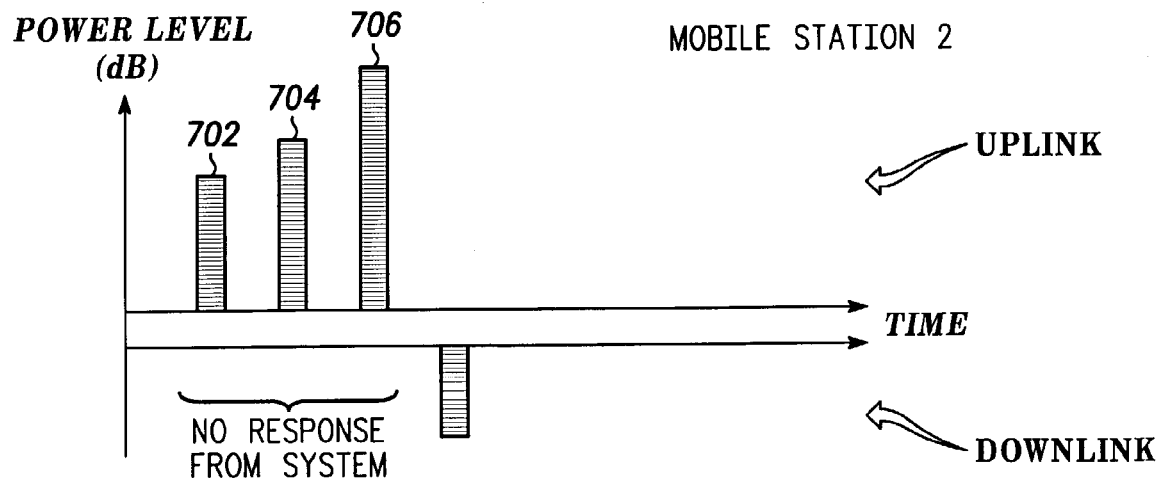
FIG. 9

METHOD FOR PROVIDING IMPROVED ACCESS TIMES FOR A COMMUNICATION DEVICE

TECHNICAL FIELD

This invention relates in general to the field of wireless communication. More specifically, this invention relates to a method and apparatus that provides for a high priority channel grant by varying the access transmission power.

BACKGROUND

A Mobile Station (MS) operating in a communication system such as a Code Division Multiple Access (CDMA) system attempts to establish a signaling link with a base station also known as cell or cell site by transmitting a random access message over an access channel. The access times vary and are random due to the use of random access protocols such as the ALOHA protocol or other such random access protocols. This randomness of access creates a non-deterministic access time.

In present day communication systems, such as CDMA and Wideband CDMA (WCDMA) that includes Universal Mobile Telephone Service (UMTS), MSs can support differentiating services. Services may vary based on the Quality of Service (QoS) they request from their system. For example, there are presently four QoS defined in the UMTS standard: streaming, conversational, interactive and background. As more and more types of applications are added, some of these applications may require other different types of access priority. For instance, MSs that are capable of a voice dispatch mode of operation cannot afford to wait a long time for a channel to be granted to them. While other applications like Internet browsing can absorb a longer setup time, since the MS user can wait for the system to setup before commencing to web browse.

In a CDMA or WCDMA system, when a MS attempts to transmit a random access message to the system, it calculates its transmission power level based on an open loop power control algorithm. Since the MS is not yet communicating with the system in a closed loop power control mode, it resorts to measuring its closeness to its cell site in order to calculate its initial power level setting. The open loop estimate is typically based on the signal strength of the pilot signal it receives from the cell site. On average, the MS will resort to a low transmission power level setting due to the fact that the MSs operating in the system are continually cell relocating while in idle mode in an effort to stay connected to the "best" cell site.

In a third-generation wireless communication system like a UMTS cellular system, a Random Access Channel (RACH) preamble is transmitted by an MS to the cell site in order to access the system. The RACH is an uplink-shared channel used for initial channel access to the system (e.g., for call origination, registration messages, and paging response) as well as for short data bursts (e.g., for sending Short Messaging Service packets). At the cell site, the received signal is correlated to the RACH preamble sequence in order to detect an MS access call.

Referring now to FIG. 1, there is shown a prior art RACH open loop power control procedure where an MS is attempting to gain channel access. The chart shows the uplink (from MS to cell site) activities for the MS while in the access mode. The MS in this illustrated example commences transmitting a first RACH preamble 102 at a first power level. If no acknowledgment is received from the system, a second random access preamble 104 is transmitted at a higher power level, for example 1 decibel (dB) higher than attempt 102. Again if no acknowledgment is received, the MS continues repeating the procedure of increasing the power level of its transmissions with each subsequent preamble transmission 106-114. The preamble transmission is increased until a certain predetermined power level. The MS will continue repeating the transmission of RACH preambles either until the system responds or a timer expires. If the timer expires, the MS waits a random period of time before retrying. When all retires have been used up, the MS quits attempting. In this example, after preamble 114 is transmitted, a system acknowledgment 116 occurs.

As shown in the example of FIG. 1, the system has taken a great amount of time to respond to the access request from the MS. This is of course is not acceptable for some types of QoS or applications like dispatch calls where the MS cannot wait too long to have access to the system. Given these problems, a need exists for a method and apparatus that can improve the access time for higher priority services/applications or particular users without any modification to the system's infrastructure, thus avoiding expensive system redesigns.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

FIGS. 1, 2 and 8 show charts illustrating a prior art RACH procedure in the open loop control mode.

FIG. 3 shows a chart illustrating a RACH procedure in accordance with the preferred embodiment of the invention.

FIG. 9 shows a chart illustrating a RACH procedure in accordance with another embodiment of the invention.

DETAILED DESCRIPTION OF THE PREFERRED EMBODIMENT

Figure 4:
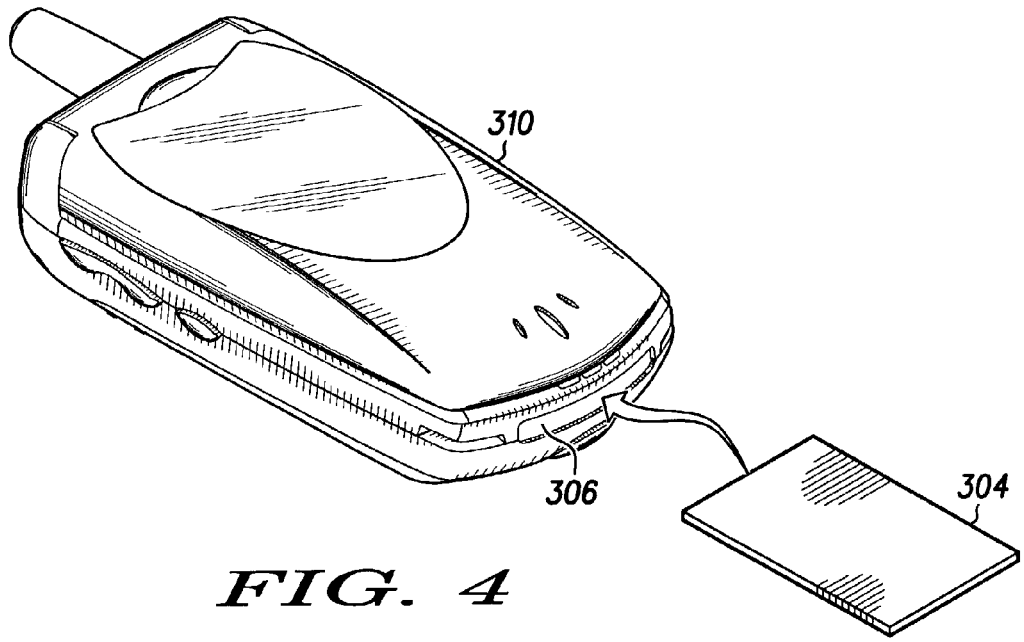
FIG. 4 shows an illustration of a cellular telephone in accordance with the invention.

While the specification concludes with claims defining the features of the invention that are regarded as novel, it is believed that the invention will be better understood from a consideration of the following description in conjunction with the drawing figures.

Referring now to FIG. 3 there is shown a chart for a RACH operation in accordance with the preferred embodiment of the invention. In order to better illustrate the operation, there is shown a first MS, MS 1 shown in FIG. 2 and a second MS, MS 2 shown in FIG. 3 attempting to access the system. In FIG. 2, MS 1 attempts to access the system just like the MS in FIG. 1 using the prior art access methodology of transmitting the first Random Access Preamble 202 at the lowest power level or at the level determined by its open loop power control algorithm, and then increasing the power level of subsequent preambles 204-214 in a stepped fashion (e.g., 1 decibel (dB) increase per new try), which is referred to as preamble power ramping until a system response 216 is received.

MS 2 on the other hand as shown in FIG. 3, uses an access method in accordance with the preferred embodiment, whereby MS 2 uses a higher power level priority RACH request 218, per its radio capability, to quickly access the channel. Instead of commencing its request cycle at a low power level for the first RACH preamble transmission like MS 1, MS 2 transmits at a higher power level up to in some cases the maximum level that what would be allowed by the particular system, thus enhancing its chances of reaching the system and getting a channel grant as quickly as possible. In one particular example, the power level of RACH preamble transmission 218 could be the same as the highest level MS 1 would use for transmission of RACH preamble 206 (its last attempt). The power level chosen will be higher than the equivalent cellular telephone such as MS 1 would have used assuming they were both receiving a pilot signal of exactly the same strength from the same cell site in their open loop power control mode.

Given that MS 2 in accordance with the invention transmits with a higher power level than MS 1, MS2 should in all probability receive a system response to its RACH preamble transmission earlier than MS 1 since it has a higher probability of reaching the cell site given the greater power level it used for its RACH preamble transmission 218. Although the randomness of the access transmissions may cause MS 1 at times to get a system response earlier than MS 2.

MS 2 will also attempt a number of retries 220 and 222 if there is no system response. MS 2 will stop the retries once a system response 224 is received at MS 2.

In another embodiment like that one shown in FIG. 9, the initial power level used by MS 2 for its RACH transmission 702 may be at a higher level than the first RACH transmission 710 used by MS 1 as shown in FIG. 8 based on the prior art open loop power control technique, but lower than the maximum power level that could be used by MS 2. Also, MS 2 in accordance with the invention can transmit subsequent RACH retry transmission 704 and 706 at higher power levels than RACH transmission 702, but with much larger power level increases than MS 1 uses (e.g., greater than 1 dB like in the MS 1 example).

Referring now to FIG. 4, there is shown a diagram of a communication device such as a CDMA cellular telephone 302 in accordance with the invention (similar to MS 2 in FIGS. 3 and 9). Cellular telephone 302 preferably includes a slot 306 for accepting an external card 304 such as a smart card or Subscriber Identity Module (SIM) card. In accordance with one embodiment of the invention, external card 304 includes stored therein power level information for cellular telephone 302 to use while it performs its RACH preamble transmissions. For example, if the cellular telephone user is a Very Important Person (VIP), he may be given a card 304 which would cause his cellular telephone to attempt its first RACH preamble transmission at the highest power level acceptable by the system or at least higher than other MSs in the system would use. This would allow the VIP user the highest probability of gaining system access as quickly as possible as compared to other users whose cellular telephone's would base their initial power level setting on their open loop power control algorithm (mode) that is based on the signal strength of the pilot signal the MS receives from its cell site. The card 304 can have power level settings based not only on specific users, but can also be based on class of service, were users who pay a higher fee receive cards that have higher power level settings for the access transmissions.

In another embodiment, the power levels provided in card 304 or pre-stored in memory in cellular telephone 310 may be associated (linked) to different types of applications or QoS. For example, if MS 310 determiined that a system access request was needed, given that the user for example wanted to conduct a voice dispatch call, the power level stored for a dispatch call may be the highest available, while a lower priority application, for example, web browsing may be assigned a lower power level to use for the initial priority RACH preamble transmission. Unlike the prior art open loop power level determination algorithm, the MS will be assigned a power level for the RACH transmission based on the application/QoS that the MS is requesting access to the system for. Moving card 304 from one MS to another MS, the privileged user can maintain the same access privileges without any further intervention by the user.

Figure 5:
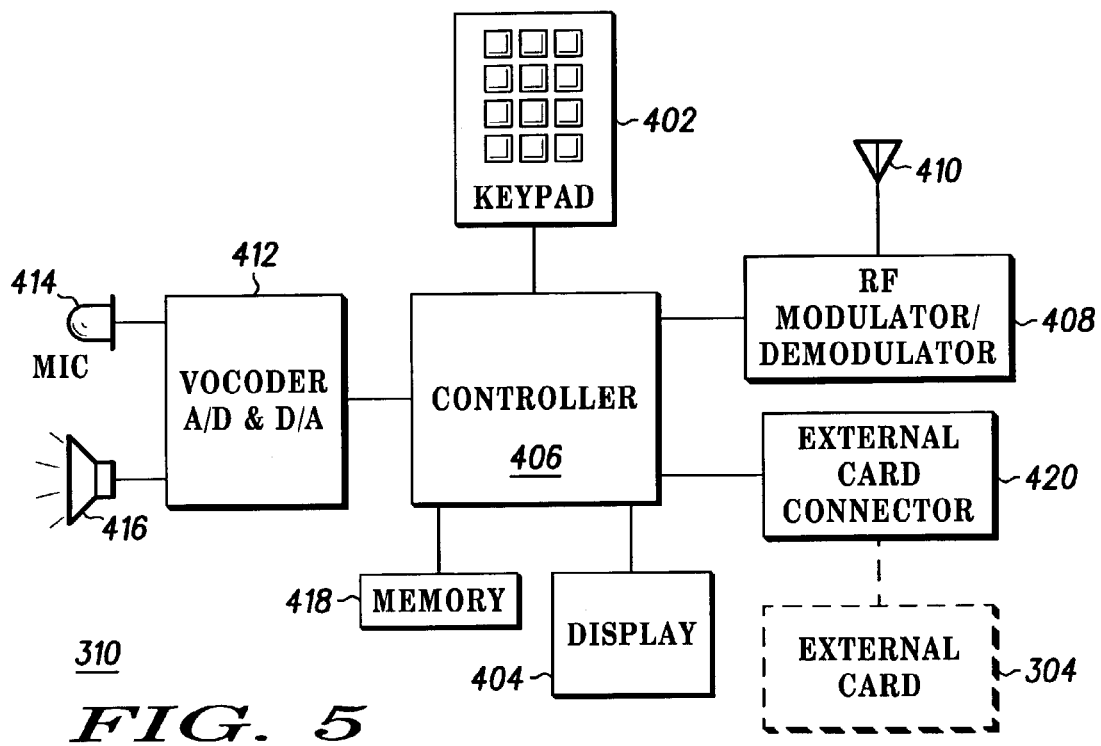
FIG. 5 shows a block diagram of the cellular telephone of FIG. 3.

Referring now to FIG. 5, there is shown a simplified block diagram of MS 310. MS 310 is pretty much a conventional telephone, except that it has stored therein either in memory 418 or in external card 304 power level information that will allow the MS 310 to transmit at a higher power level than would typically be the case in the open loop power level mode. The power level chosen for the RACH transmission is preferably either based on the particular user and/or the application the MS 310 is requesting access for. The power level information, if stored in the MS's memory 418 can be either pre-stored or can be transmitted by the cellular system to the cellular telephone 310 over the air once the cellular telephone is turned on and registers with the system. If the information is transmitted over-the-air, alterations have to be made to the system infrastructure to support the transmission of power level messages.

MS 310 includes a controller 406 such as a microprocessor and/or digital signal processor that controls the overall function and operation of the MS 310. A keypad 402 and display 404 are coupled to the controller 406 and allow for user interface with MS 310. A microphone 414 is provided for converting voice from the user into electrical signals, while a speaker 416 provides audio signals to the user. An external card connector 420 couples external smart or SIM card 304 to the controller 406.

A vocoder, Analog-to-Digital (A/D) and Digital-to-Analog (D/A) block 412 provides all the necessary digital voice processing for converting analog voice into digital data ready for RF transmission and vice versa. RF modulator/demodulator block 408 transmits and receives the RF signals via antenna 410.

As previously discussed, the power levels that will be used for the RACH preamble transmissions in accordance with the invention can either be stored in memory 418 or in external card 304. As also previously mentioned, these power levels can be either dependent on a particular user (e.g., MS identification number), or can be associated with different applications/QoS that MS 310 can support. For example, a first power level will be associated with a dispatch call application; a second power level will be associated with a second application such as web browsing, etc. Preferably, higher power levels will be associated with applications requiring faster access to the communication system.

Figure 6:
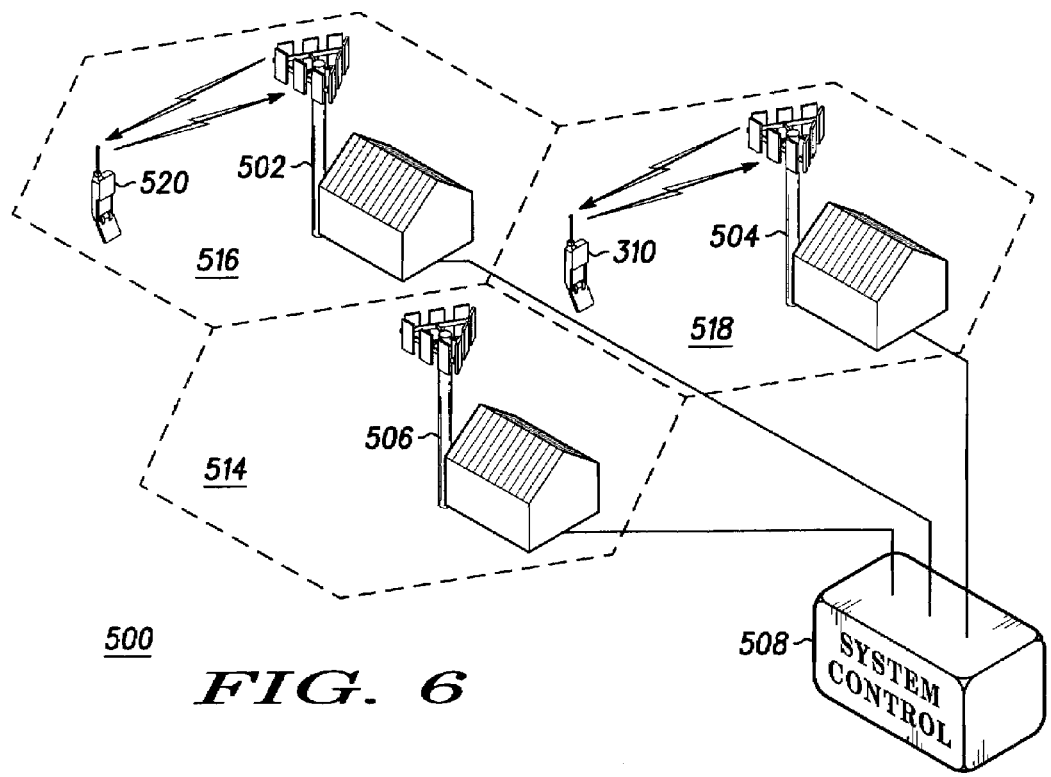
FIG. 6 shows a diagram of a communication system in accordance with the invention.

In FIG. 6, there is shown a diagram of a communication system like one that can be used with the present invention. Communication system 500 includes a plurality of base stations or cell sites 502–506. Each cell site provides the radio frequency link between the land network and the portable communication devices or Mobile Stations (MSs)

310 and 520. Each cell site 502, 504 and 506 provides communication coverage over their respective cell coverage areas 516, 518 and 514.

Figure 7:
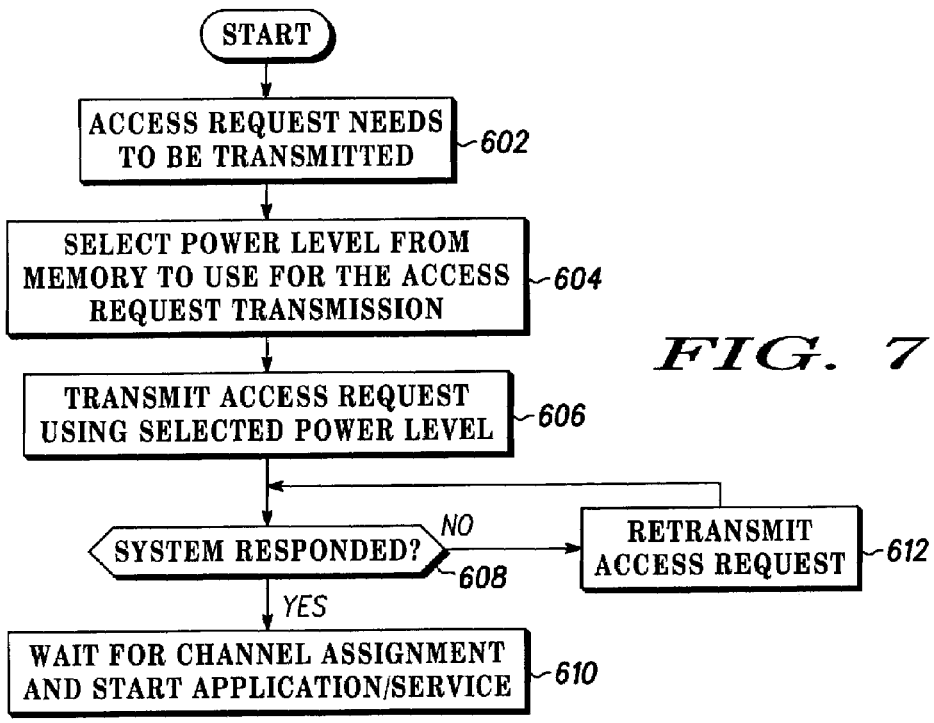
FIG. 7 shows a flowchart highlighting some of the steps taken in accordance with the invention.

A conventional system control 508 provides the needed coordination between the cell sites 502–506, the landline network (e.g., Public Switched Telephone Network, Internet, etc.), and MSs 310 and 520 operating within the wireless communication system. Per the present invention, the MS 310 once it determines that it needs to send an access request to the system, given that the MS user for example has requested a service, the MS 310 transmits its access request with a higher power level as discussed above. In FIG. 7, there is shown a simplified flowchart highlighting some of the steps taken in accordance with the preferred embodiment. In step 602, MS 310 determines that an access request needs to be transmitted given that the MS user wants to get a channel grant in order to for example begin web browsing, transmit a picture, commence a dispatch call, etc. In step 604, the controller 406 selects the appropriate power level stored in memory 418 or optional external card 304. In step 606, MS 310 transmits an access request to the system using the power level selected. As previously mentioned, the power level selected from memory may be associated with the service or application (e.g., web browsing) the user wants to perform, or associated with the specific user of the MS 310. In another embodiment, the power level can be sent to memory 418 over the air by the system control 508, for example at the time of registration of the MS 310 to the system 500.

In step 608, MS 310 determines if a system response to the access request has been received. If the access request was received, in step 610, then the MS 310 waits for a channel assignment, etc. to be completed prior to commencing with the application/service the user requested. If it is determined in step 608, that there has not been a system response in a predetermined period of time, the MS 310 in step 612, retransmits another access request either at the same power level, if for example the highest power level was used as shown in FIG. 3 for MS 2, or at a higher power level as shown in FIG. 9 for MS 2. This retransmission cycle can continue for a predetermined number of attempts or until a timer expires, at which point the MS 310 will stop attempting to access the system and notifies the user (e.g., audible alert).

The present invention provides for a priority access technique that provides for improved access times. This priority access technique is essential if wireless applications such as dispatch calls that require fast access times will be provided on wireless systems like CDMA and WCDMA (e.g., UMTS) systems. The invention is easy to implement since the changes required are almost all, if not all, in the MS side, and can be done with a minimal software upgrade, but introduces a great concept of prioritizing the RACH preambles. In the particular case the power levels to be used in the priority access technique are to be provided via Over The Air Programming (OTAP), some software updates will be required in the system control 508 to support the transmission and association of different power levels to different users or applications/QoS. Although in the preferred embodiment, the RACH was used as the uplink channel to gain fast access, other uplink channels can be used, depending on the wireless system the present invention is being implemented in.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for providing improved access times for a communication device operating in a wireless communication system that uses an open loop power control mode to determine initial power levels for system access request transmissions, comprising the steps of:

storing power level information to be used when transmitting an access request to the wireless communication system in a memory area of an external card for the communication device;

determining that the access request needs to be transmitted by the communication device;

selecting a power level from the power level information stored in the memory area to use during the access request transmission; and transmitting the access request at the power level, wherein the power level is greater than would have been used by the communication device had it determined the power level to use while in the open loop power control mode.

2. A method as defined in claim 1, wherein the access request comprises a Random Access Channel (RACH) preamble.

3. A method as defined in claim 1, wherein the power level used for transmitting the access request is dependent on the user assigned to the communication device or the identification number of the communication device.

4. A method as defined in claim 1, wherein the power level used for the channel access request is stored within the communication device.

5. A method as defined in claim 1, wherein the power level used for transmitting the access request is dependent on the particular application or Quality of Service (QoS) the communication device is requesting channel access for.

6. The method according to claim 5, wherein the application or QoS requires quicker access times.

7. A method as defined in claim 1, wherein the power level used in the transmitting step is the highest power level that the communication system allows a communication device to use.

8. A communication device operable in a communication system that requires an access request be sent by the communication device in order for a channel to be assigned to the communication device by the communication system for use by the communication device for a particular application/service, the communication system uses an open loop power control mode to determine initial power levels for the access request transmissions, the communication device comprising:

a controller;

a transmitter coupled to the controller;

a memory coupled to the controller, stored in the memory is power level information to be used when transmitting the access request to the communication system;

the controller selects a power level from the power level information stored in memory to use during the access request transmission, the selected power level being greater than would have been used by the communication device had it determined the power level to use while in the open loop power control mode;

an external card connector coupled to the controller;

the external card having a memory area, the external card coupled to the external card connector; and the memory area in the external card forms part of the memory, and the power level selected by the controller for the access request transmission is stored in the memory area of the external card.

9. A communication device as defined in claim 8, wherein the access request transmission comprises a Random Access Channel (RACH) preamble.

10. A communication device as defined in claim 8, wherein the power level selected by the controller for transmitting the access request is dependent on the user assigned to the communication device or the identification number of the communication device.

11. A communication device as defined in claim 8, wherein the power level selected by the controller for use in transmitting the access request is dependent on the particular application or Quality of Service (QoS) the communication device is requesting channel access for.

12. The method according to claim 11, wherein the application or QoS requires quicker access times.

13. A communication device as defined in claim 8, wherein the power level selected by the controller is the highest power level that the communication system allows the communication device to use during an access request transmission.

14. A communication device as defined in claim 8, wherein the communication device comprises a communication device operable in a Code Division Multiple Access (CDMA) or Wideband CDMA (WCDMA) communication system.

15. A communication device as defined in claim 8, wherein the communication device comprises a communication device operable in a Universal Mobile Telephone Service (UMTS) communication system.

16. A communication device as defined in claim 8, wherein the controller selects a higher power level from the power level information stored in memory for a subsequent access request transmission if a system response is not received at the communication device in a predetermined period of time.

* * * * *